United States Patent [19]

Davis

[11] Patent Number: 4,606,108

[45] Date of Patent: Aug. 19, 1986

[54] DRILL BIT METHOD AND APPARATUS

[75] Inventor: Kenneth Davis, Midland, Tex.

[73] Assignee: W. Wesley Perry, Midland, Tex.

[21] Appl. No.: 803,326

[22] Filed: Dec. 2, 1985

[51] Int. Cl.⁴ .......................... B23P 6/00; B26D 1/00
[52] U.S. Cl. ................... 29/402.03; 29/426.5;
76/101 A; 175/329; 175/413; 407/36; 407/72
[58] Field of Search ................ 407/33, 34, 36, 40–42,
407/47, 51, 57, 59, 72, 120; 175/410, 412, 413,
329, 382; 76/101 A; 29/426.5, 402.03; 279/1 E,
103; 408/187, 188

[56] References Cited

U.S. PATENT DOCUMENTS

| | | | |
|---|---|---|---|
| 880,773 | 3/1908 | Bannister | 407/72 |
| 1,615,969 | 2/1927 | West | 407/72 |
| 2,958,119 | 11/1960 | Stansfield et al. | 407/40 |
| 2,976,069 | 3/1961 | Meredith | 29/426.5 |
| 3,075,593 | 1/1963 | Holsing | 175/413 |
| 3,498,677 | 3/1970 | Morrow | 279/103 |
| 3,537,539 | 11/1970 | Adcock | 175/413 |
| 4,200,159 | 4/1980 | Peschel et al. | 175/329 |
| 4,265,324 | 5/1981 | Morris et al. | 175/413 |

FOREIGN PATENT DOCUMENTS 12501 of 1884 United Kingdom ............... 408/188

*Primary Examiner*—Leonidas Vlachos
*Attorney, Agent, or Firm*—Marcus L. Bates

[57] ABSTRACT

A drill bit has a formation engaging face from which there extends a plurality of stud assemblies having a diamond cutting face thereon. Each of the stud assemblies are mounted within a socket by a close tolerance press fit. A reduced diameter rearwardly extending passageway leads from the rear of the socket back up to the face of the bit so that when the diamond face of the stud assembly becomes worn, a tool can be extended through the passageway to the rear of the socket and into contact with the stud assembly to force the stud assembly from the socket. The stud assembly is then rotated a few degrees to present a new cutting edge to the formation, and pressed back into the socket, thereby returning the drill bit to like new condition.

10 Claims, 13 Drawing Figures

DRILL BIT METHOD AND APPARATUS

BACKGROUND OF THE INVENTION

Polycrystalline diamond cutter drill bits take on several different forms. The cutter assembly usually is in the form of a cylindrical stud having a polycrystalline diamond cutter disc or wafer applied to the forward end thereof, so that the outermost face of the diamond material engages the formation during the drilling operation. The diamond cutter disc gradually becomes worn as evidenced by a flat or crescent shaped portion thereof progressively being worn away. The unworn part of the disc represents more than 80% of the circumference thereof left in usable condition, but nevertheless, a new unworn edge of the disc must be presented to the formation in order to achieve suitable penetration efficiency of the bit. This usually requires replacement of the entire stud assembly.

Others skilled in the art have proposed heating the bit body, removing the stud assembly, rotating the stud assembly between 45°-180°, and reattaching the assembly to the bit body, thereby avoiding the purchase of a new stud assembly. Others have proposed to remove the stud assembly, remove the polycrystalline diamond cutter disc therefrom, reattach the disc to a new stud, and replace the stud within the bit face.

Heretofore, the simple expedient of rotating a diamond stud assembly 45°-180° respective to the bit body has involved a considerable amount of equipment, time, and cost. It would, therefore, be desirable to be able to rotate the diamond stud assembly respective to the bit body with a minimum of equipment and effort so as to place the bit in like new condition with a minimum of time and expense. Such a desirable mechanical operation is the subject of the present invention.

SUMMARY OF THE INVENTION

The present invention comprehends both drill bit method and apparatus by which a new drill bit configuration enables the stud assemblies thereof to be easily removed and replaced by the employment of very little equipment and effort. The bit has a lower formation engaging face within which a plurality of sockets are formed, with the sockets being arranged with the longitudinal axial centerline thereof angled respective to the horizontal, so that the cutting edge of the cutter assembly extends at an angle slightly away from the face of the bit to cause the cutting element thereof to engage and penetrate a formation located downhole in a borehole.

A reduced diameter passageway extends rearwardly from communication with the rear of the socket, and leads back to the face of the bit. The stud assembly is forced into the socket by a close tolerance fit. The bit is used in a drilling operation until the cutting face thereof has worn away sufficiently to reduce the efficiency of penetration to an unsatisfactory value, whereupon the bit is removed from the borehole, the stud assemblies are removed from the socket, rotated to bring a new cutting edge into proper cutting position, whereupon the stud assembly is then forced back into the socket, thereby providing a suitable rebuilt drill bit at a very low cost.

In one specific embodiment of the invention, a passageway of reduced diameter extends rearwardly of the socket and intersects with a vertical counterbore. A steel ball is positioned at the intersection of the socket passageway and counterbore, and a wedge tool is forced into the counterbore, with the wedge surface thereof engaging the ball, and forcing the ball with considerable mechanical advantage into abutting engagement with the interface of the stud assembly, whereupon application of sufficient force causes the stud assembly to be forced from the socket.

In another form of the invention, the socket passageway leads directly from the rear of the socket and back to the face of the bit so that a force can be applied directly to the rear face of the stud assembly.

Accordingly, a primary object of the present invention is the provision of a method for removing stud assemblies from a drill bit.

Another object of the present invention is the provision of an improved drill bit having stud assemblies positioned within a socket in such a manner that the stud assembly can be easily removed from the face of the bit.

A further object of this invention is the provision of a drill bit having a plurality of sockets arranged in radially spaced relationship with there being a passageway extending rearwardly from each socket back to the face of the bit which enables a tool to force the stud assembly from the face of the bit.

A still further object of this invention is the provision of method and apparatus for rebuilding a polycrystalline diamond bit by removing each of the stud assemblies, rotating the stud assemblies to bring a new cutting edge thereof into cutting position, and replacing the stud assemblies within a socket located at the face of the bit.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described in the above abstract and summary.

DETAILED DESCRIPTION OF THE PREFERRED EMBODIMENT

In FIGS. 1–5, there is disclosed a prior art stud assembly 12 which includes a stud 14 having a polycrystalline diamond cutter in the form of a wafer or disc 16 bonded thereto. Numeral 18 indicates the layer of polycrystalline diamond applied to the face of the disc.

Figure 1:
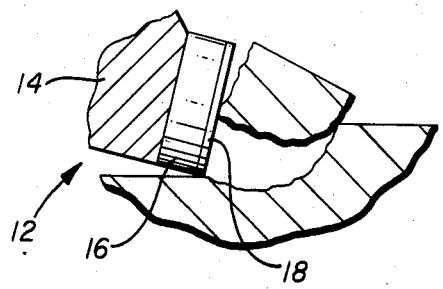
FIGS. 1 and 3 are fragmentary, part cross-sectional views of prior art stud assemblies associated with a drill bit.
Figure 2:
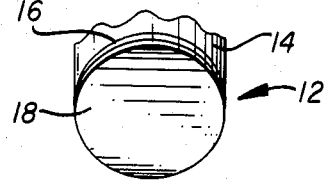
FIGS. 2, 4, and 5 are fragmentary, front, elevational views of a prior art stud assembly.
Figure 3:
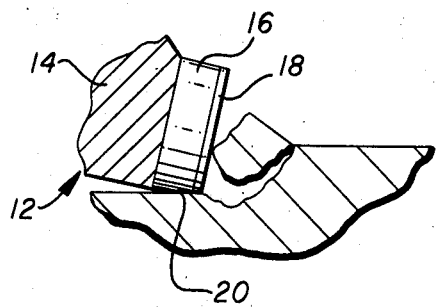
Figure 4:
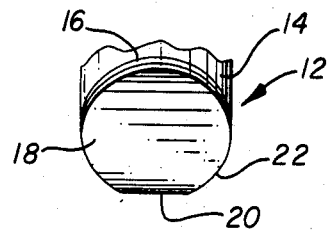
Figure 5:
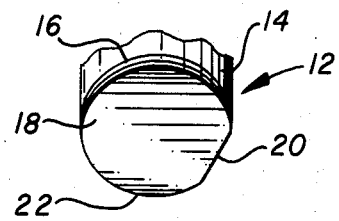

As a diamond bit is used downhole, the disc which supports the layer of diamonds becomes worn into a flat as illustrated by numeral 20. Numeral 22 indicates that more than 80% of the circumferentially extending cutting edge of the disc is in satisfactory condition. As seen in FIG. 5, rotation of the flat 20 respective to the stud presents a new cutting edge 22 for efficient engagement and penetration of a formation.

Figure 6:
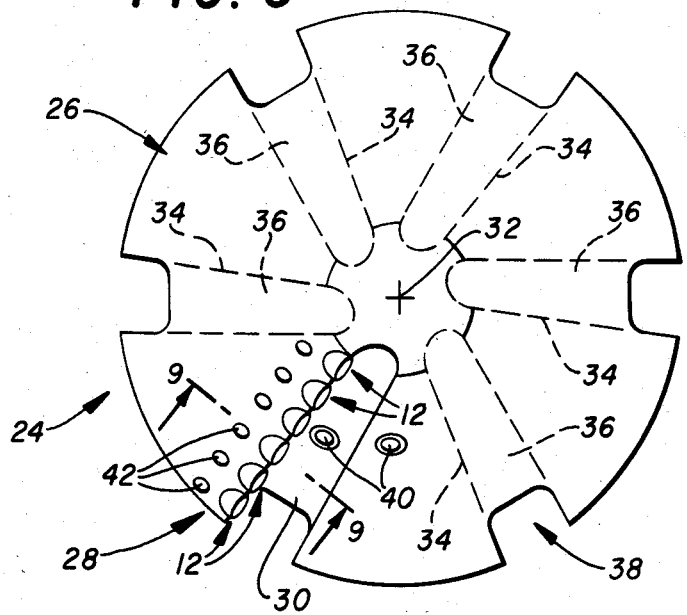
FIG. 6 is a bottom, plan view showing the face of a diamond drill bit made in accordance with the present invention.
Figure 7:
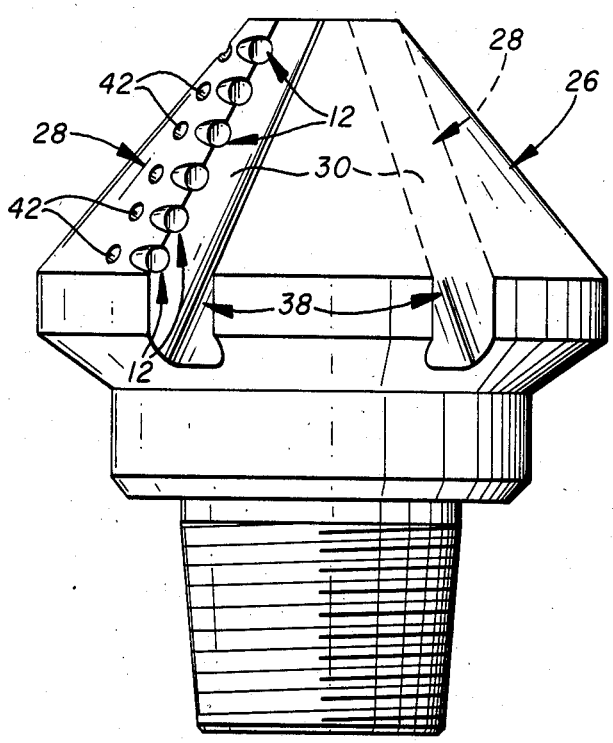
FIG. 7 is a side elevational view of the drill bit disclosed in FIG. 6.
Figure 8:
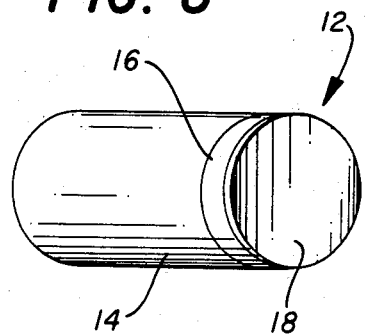
FIG. 8 is an enlarged, oblique view of a stud assembly made in accordance with the present invention.

FIGS. 6 and 7 illustrate one form of a diamond drill bit 24 made in accordance with the present invention. The bit includes a lower face 26 having rows 28 of stud assemblies rearwardly located respective to a recessed area 30. Numeral 32 indicates the apex of the bit face. Other radial lines 34 of stud assemblies are rearwardly placed respective to other recessed areas 36 as indicated by the dot-dash lines in FIGS. 6 and 7.

Vertical slots 38 provide a passageway for the return of drilling fluid and cuttings to the surface of the earth. Nozzles 40 provide for flow of drilling mud to the face of the bit. Blind holes or counterbores 42 are located rearwardly of each stud assembly, as will be pointed out in greater detail later on.

Figure 9:
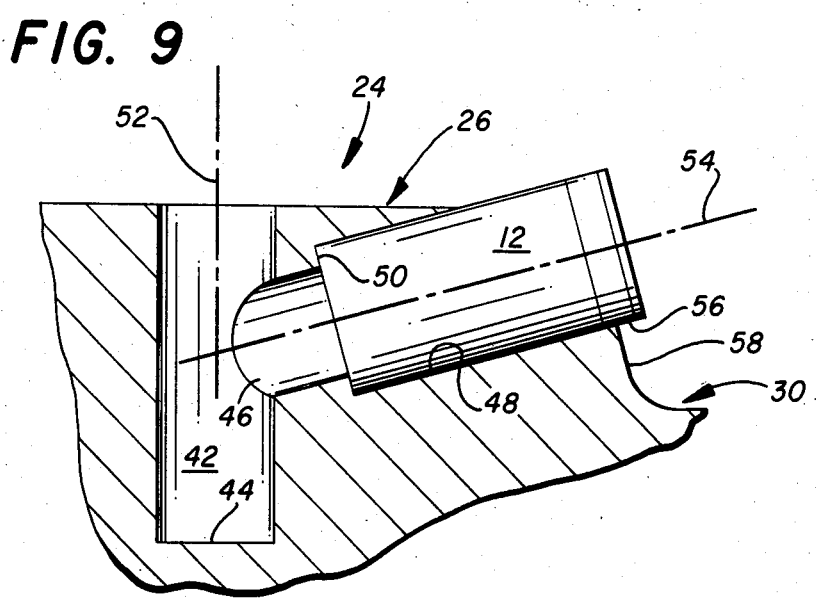
FIG. 9 is an enlarged, fragmentary, cross-sectional view taken along line 9—9 of FIG. 6.

As best seen illustrated in the embodiment set forth in FIGS. 9–11, the blind holes 42 have a bottom 44 spaced below a socket passageway 46. Sockets 48 have one end that extends obliquely through the face of the bit and another end which terminates at shoulder 50. The blind holes have an axial centerline 52 which intersects an axial centerline 54 of the socket and socket passageway. The marginal far end 56 of the stud assembly has an upper formation engaging marginal portion which extends above the face 26 of the bit and beyond wall 58 of recess 30.

Hence, the blind hole 42 together with the socket passageway 46 forms a passageway which extends rearwardly from the socket back up to the face of the bit.

Figure 10:
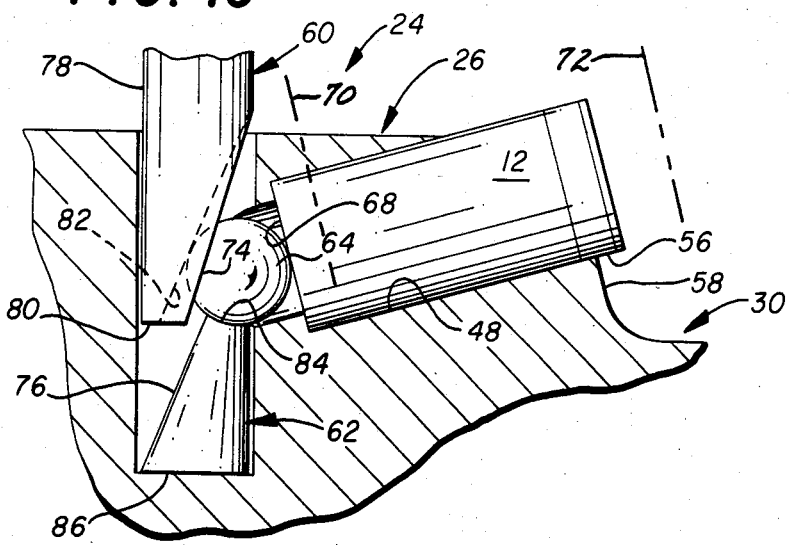
FIG. 10 is similar to FIG. 9, and additionally shows the operation of the method of one embodiment of the present invention.
Figure 11:
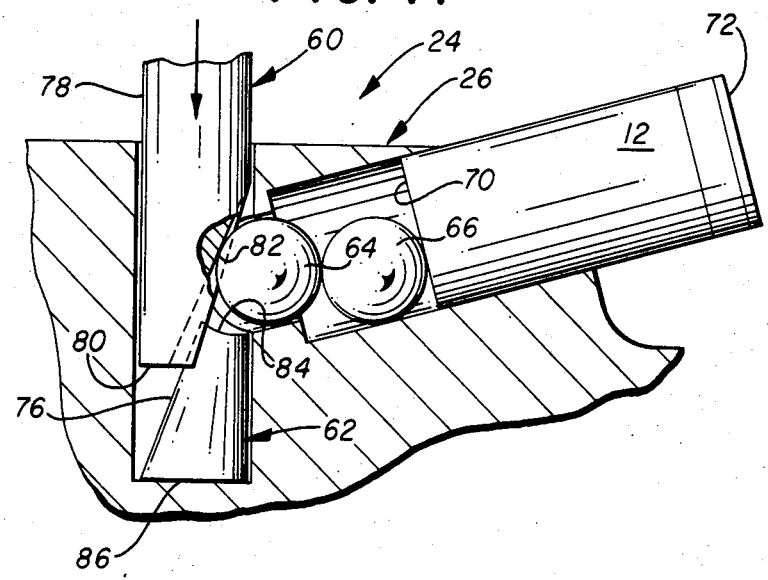
FIG. 11 is similar to FIG. 10 and shows a further operation of the present invention.
Figure 12:
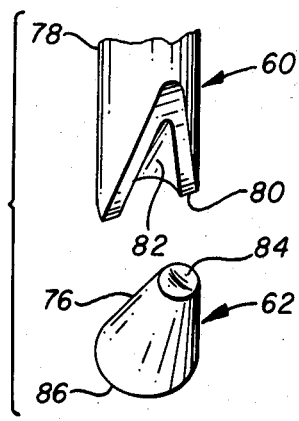
FIG. 12 is a side elevational view of part of the apparatus disclosed in FIGS. 10 and 11; and, FIG. 13 is a cross-sectional view, as may also be taken along line 9—9 of FIG. 6, disclosing another embodiment of this invention.

As best seen in FIGS. 10–12, a wedge tool 60 is telescopingly received within the blind hole, while a support post 62 is removably seated in the bottom of the hole. A steel ball 64 rests on top of the support post and is of a size to be snugly received within the stud passageway. The numeral 66 indicates a second steel ball which may be used on occasion. The rear face 68 of the stud assembly can be moved into the position indicated at the dot-dash line by numeral 70 while the dot-dash line at numeral 72 indicates the position of the diamond disc after the ball 64 has moved the stud assembly by the downward movement of the wedge tool.

The wedge tool includes a circular grooved sloped face formed at an angle 74 into the lower marginal end of the tool. The support post includes a complementary surface 76 which receives the circular groove thereagainst when the two tools are moved into engagement with one another as the ball is forced to travel outwardly through the stud passageway. The upper marginal end of the wedge tool preferably is of constant diameter at 78. The lower end 80 of the wedge tool is of a size to enable it to telescopingly receive the rounded surface 76 of the support post when the tools are forced into contact with one another.

The upper end 84 of the support post is preferably curved to guide the ball 64 partially into the stud passageway. The bottom 86 of the support post firmly seats against the bottom of the blind hole.

The present invention provides a new drill bit having a novel socket for receiving a stud assembly therewithin. The stud assembly and socket are of a relative size so that when the bit body is heated to about 500° F., the difference in the coefficient of expansion of the stud and bit body enables the stud to be easily removed from the socket. When the stud assembly is placed into the illustrated position seen in FIG. 10, equilibrium of the assembly at ambient temperature causes the stud assembly to be firmly and permanently held into position due to the frictional forces developed between the interfaces thereof.

The stud assembly preferably is made of tungsten carbide while the bit body is made of 4140 steel. The stud assembly is removed from the bit face by placing the support post into the position illustrated in FIG. 10, and thereafter the hard steel ball is dropped into position on top of the post. The wedge tool is then positioned in the illustrated manner of FIG. 10 and the upper end thereof either impacted with a hammer or placed within a hydraulic press so as to force the stud assembly into the position indicated by the dot-dash lines at 70 and 72. The bit body preferably is heated up to 500° F. prior to removal of the stud assembly. After the stud assembly has been moved into position 72, it is generally possible to clamp the stud with a pair of pliers, rotate the stud assembly approximately 45°, and thereafter force the stud back into operative position, with a new cutting edge being presented to the formation. This operation moves the diamond disc from the position seen in FIG. 4 into the position seen in FIG. 5.

Figure 13:
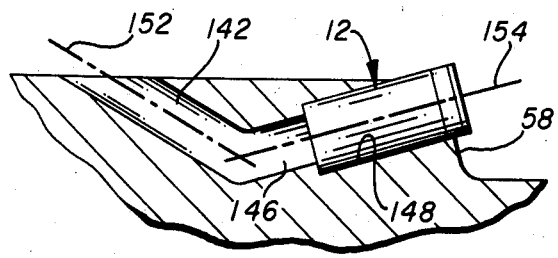

In the embodiment of FIG. 13, the stud assembly 12 is positioned in the same manner seen in FIGS. 6–11. The passageway which leads from the rear of socket 148 is comprised of reduced diameter passageway 146 and bore 142. The axial centerlines 152 and 154, respectively, of the bore and socket passageway, intersect one another as illustrated. The passageways 142, 146 are of a size to receive a steel ball in a manner similar to the illustration set forth in FIG. 10.

I claim:

1. In a drill bit having a lower cutting face which includes a plurality of stud assemblies radially spaced from a longitudinal axial centerline of the bit, each stud assembly being mounted within a stud receiving socket which is formed in the bit cutting face, the method of removing the stud assemblies from the sockets of the bit face, comprising the steps of:

forming a socket passageway along the longitudinal axial centerline of said stud receiving socket and extending the passageway rearwardly of the socket;

forming a blind passageway which extends from the bit cutting face into the bit body, and into intersecting relationship respective to the socket passageway; while arranging said socket passageway and said blind passageway laterally respective to one another;

forming a wedge face on one side of a tool, forming a support post which has one side inclined to receive the wedge face of the tool thereagainst;

forcing a ball to move from the cutting face of the bit, into the blind passageway, onto the support post, then into the socket passageway, and into abutting engagement with a rear end portion of the stud assembly;

placing the wedge face against the side of the ball which is opposed to the stud assembly; forcing the tool to move into the blind passageway while part of the tool engages the blind passageway and the wedge face engages the ball and thereby forces the ball to move in a direction away from the blind passageway;

applying sufficient force to the tool to cause the ball to engage the stud assembly with sufficient force to be moved outwardly in a direction away from the socket, thereby releasing the stud assembly from the socket.

2. The method of claim 1 wherein the ball is forced to move further along the socket passageway by:

removing the tool from the blind passageway, placing another ball within the blind passageway and onto the support post, placing the wedge face of the tool against said another ball, forcing said another ball towards the first recited ball while the first recited ball forces the stud assembly to move from the socket.

3. The method of claim 1 wherein said stud assembly includes a diamond cutting face thereon, and further including the steps of:

rotating said cutting face to present a new cutting edge to the formation after the stud assembly has been moved respective to the socket;

and replacing said stud assembly within the socket.

4. In a drill bit having a lower cutting face which includes a plurality of stud receiving sockets formed into the bit and through the cutting face, and a stud assembly mounted in each socket, the method of removing the stud assemblies from the sockets, comprising the steps of:

forming a reduced diameter passageway which extends rearwardly from communication with said socket to the face of the bit by forming a socket passageway along the longitudinal axial centerline of said socket;

forming a blind passageway which extends from the bit face into intersecting relationship respective to the socket passageway;

said socket passageway and said blind passageway are arranged laterally of one another and jointly form the first recited passageway;

selecting a ball having a diameter of a value which is less than the diameter of the passageway; placing said ball against a rear end of one stud assembly by moving the ball through the blind passageway and into the socket passageway;

forming a wedge face on one side of a tool, placing the wedge face against the side of the ball which is opposed to the stud assembly; forcing the tool to move into the blind passageway while the wedge face forces the ball to move away from the blind passageway;

carrying out the step of placing the ball by supporting the ball within said blind passageway in alignment with the socket passageway by supporting the ball on a support post which has one side inclined to receive the wedge face so that the wedge face can move into a position adjacent to the support post;

applying sufficient force to the ball to cause the stud assembly to be forced to move outwardly in a direction away from the socket, thereby releasing the stud assembly from the socket.

5. The method of claim 4 and further including the steps of:

extending said blind passageway past said socket passageway to enable the tool and support post to be received therewithin.

6. The method of claim 4 wherein the ball is forced to move further along the socket passageway by:

removing the tool from the blind passageway, placing another ball within the blind passageway, placing the wedge face of the tool against said another ball, forcing said another ball towards the first recited ball while the first recited ball forces the stud assembly to move from the socket.

7. The method of claim 4 wherein said stud assembly includes a diamond cutting face thereon, and further including the steps of:

rotating said cutting face to present a new cutting edge to the formation after the stud assembly has been moved respective to the socket;

and replacing said stud assembly within the socket.

8. Method of building and repairing a drill bit having a cutting face formed at the lower end of the main body thereof, comprising the steps of:

(1) providing an elongated stud assembly and forming a cutting face at one end thereof;

(2) forming a stud receiving socket into the bit at the cutting face of the bit, and orienting the longitudinal axial centerline of the socket respective to the longitudinal axial centerline of the bit body so that when a stud assembly is forced into the socket, at least part of the cutting face of the stud assembly is located below the bit face to thereby bring the cutting face of the bit into a position to engage and penetrate a formation;

(3) forming a counterbore from the bit face, into the bit body; forming a socket passageway which extends rearwardly from the socket into communication with a medial length of the counterbore;

(4) forcing a stud assembly into the socket;

(5) using the bit downhole in a borehole until one edge portion of the cutting face of the stud assembly has worn away;

(6) renewing the cutting ability of the bit by selecting a tool of a size which can be received within the counterbore;

(7) supporting a ball along a marginal length of the counterbore by placing a ball support device in the counterbore;

(8) imparting a marginal length of a tool with a ball engaging inclined surface, so that the tool can simultaneously wedgedly engage the ball and a sidewall of the counterbore;

(9) forcing the ball through the counterbore, into the socket passageway and against a stud assembly;

(10) engaging a sidewall of the counterbore and a sidewall of the ball with the tool and forcing the tool into the counterbore to thereby force the stud from the socket;

(11) placing a stud assembly within the socket.

9. The method of claim 8 wherein the ball is forced to move further along the socket passageway by:

removing the tool from the counterbore, placing another ball within the counterbore, placing the inclined surface of the tool against said another ball, forcing said another ball towards the first recited ball while the first recited ball forces the stud assembly to move from the socket.

10. The method of claim 8 wherein said stud assembly includes a diamond cutting face thereon, and further including the steps of:

rotating said cutting face to present a new cutting edge to the formation after the stud assembly has been moved respective to the socket;

and replacing said stud assembly within the socket.

* * * * *